Dec. 25, 1956

J. J. J. FAKKELDIJ 2,775,645

APPARATUS FOR TAPPING TELEPHONE CONVERSATIONS FOR THE PURPOSE OF RECORDING

Filed Sept. 26, 1950

Johannes Jacobus Joseph Fakkeldij
INVENTOR.

BY

Michael S. Striker
agt.

United States Patent Office 2,775,645

Patented Dec. 25, 1956

2,775,645

APPARATUS FOR TAPPING TELEPHONE CONVERSATIONS FOR THE PURPOSE OF RECORDING

Johannes Jacobus Joseph Fakkeldij, Hilversum, Netherlands

Application September 26, 1950, Serial No. 186,710

Claims priority, application Netherlands October 6, 1949

1 Claim. (Cl. 179—1)

Figure 1:
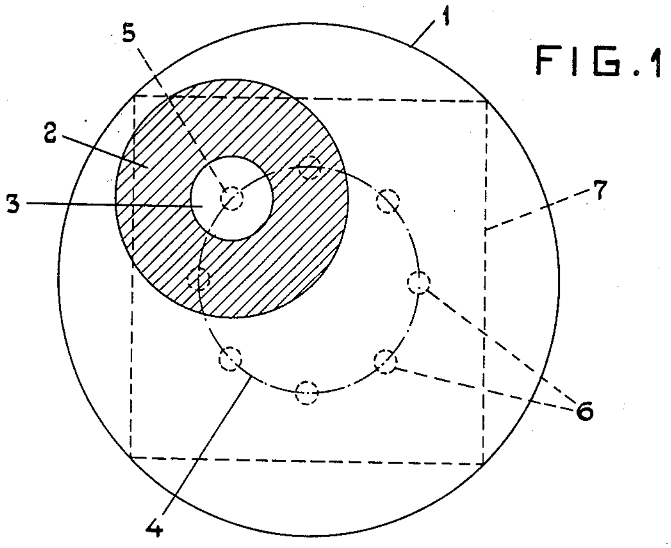

The present invention relates to an apparatus for picking up the leakage flux of a telephone apparatus.

More in particular the invention relates to an apparatus adapted to connect a telephone apparatus with a sound registrating apparatus with a view to registrate the telephonic conversation which is going on, by means of a recording apparatus of the type which is actuated by electric currents or voltages representing sound waves.

The principal object of my invention is to provide an apparatus of a construction adapted to adjust the coupling with the telephone apparatus in order to obtain an efficient coupling with the telephone apparatus, irrespective of the position of the voice coil in the apparatus.

My invention comprises a box containing a pick-up coil adapted to pick up the leakage flux of the voice coil or transformer of the telephone apparatus, and provided with means to connect said pick-up coil to a sound recording apparatus.

In order to adjust the coupling between the pick-up coil and the leakage flux of the telephone apparatus, the pick-up coil is located outside the centre of the box wherein the coil is located, and means are provided to adjust the position of said coil with respect to the voice coil or transformer of the telephone apparatus.

In a previously known device of this kind the coil which picks up the leake flux, hereafter called the tapping coil, is placed in a flat box-shaped cover and occupies a fixed position in the box. This box is then placed as a base plate under a telephone apparatus of the desk type. The magnetic lines of force generated by the leakage flux of the transmitting coil in the telephone apparatus pass through the windings of the tapping coil and generate an alternating electromotive force in it, which represents the outgoing and incoming speech vibrations. In this way a telephone conversation can be recorded by an electrical recording apparatus. A difficulty in connection with the previously known construction is the fixed position occupied by the tapping coil in the apparatus, whilst the placing of the voice coil in the telephone apparatus varies widely for different types and makes.

The relative position of both coils is of great importance in generating the highest possible electromotive force in the tapping coil, i. e. in obtaining the best possible coupling of this coil with the magnetic field of the voice coil in the telephone apparatus.

In order to obtain the most efficient coupling, without being compelled to construct a special type of the tapping device for each existing model of telephone apparatus, the telephone apparatus would have to be movable on the base device, thus modifying the relative positions of both coils and, in consequence, the coupling. However there are constructional objections to this method. Moreover, by displacing the telephone apparatus on the base plate the correct position of both coils is again disturbed.

According to the invention the above mentioned objections are overcome by placing the tapping or pick-up coil eccentrically inside the box of the tapping apparatus in such a way that its position relative to the transmitting coil of the telephone apparatus can be adjusted so as to obtain the most efficient coupling between both coils.

The invention will now be explained by reference to the accompanying drawing in which two embodiments are shown in outline by way of example. In this drawing:

Fig. 1 shows a top view of the embodiment in which the tapping coil is placed eccentrically and movably in the box.

Figure 2:
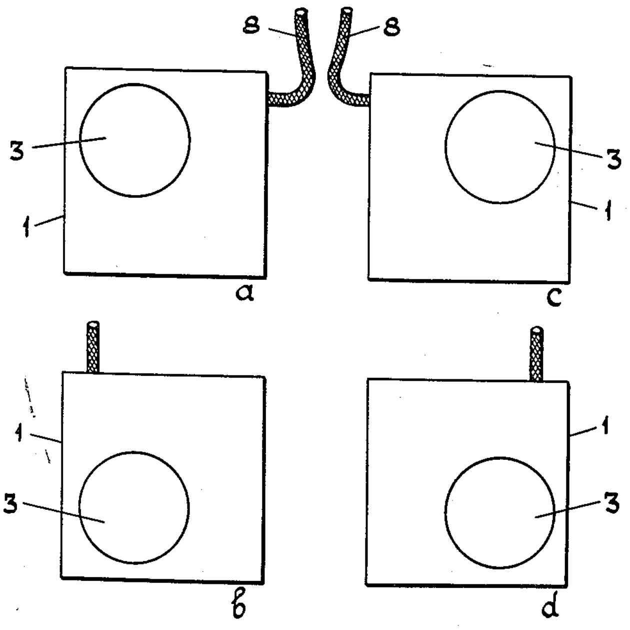

Fig. 2 a top view of another embodiment, in which the tapping coil is mounted in a fixed position eccentrically in the box, and in which four different positions of the tapping coil are obtained by rotating the box or turning it upside down.

In the embodiment according to Fig. 1, 1 represents a cylindrical box, which serves as a base for the telephone apparatus (not shown), of which the lower edge is indicated by 7. The box 1 can be made of any suitable material, for instance of plastic, and it consists of two parts which fit into each other. Inside the box a tapping or pick-up coil 2 is placed eccentrically and may for instance be fixed on a cylindrical pin 3, which is secured by means of a screw 5 in the lower part of the box. On the pitch circle 4 several screw holes 6 are provided, so that the pin 3 and consequently the tapping coil 2 can occupy several positions in the box. Thus the most efficient coupling with the voice coil of the telephone apparatus can be obtained.

In this embodiment of the box it is also possible to secure the tapping coil immovably in the box, whilst the position of the tapping coil in relation to the voice coil of the telephone apparatus can then be adjusted by rotating the whole about an axis perpendicular to the end faces, the centre of the pick-up coil moving along the pitch circle.

According to the embodiment illustrated in Fig. 2 the pick-up coil 3 is mounted eccentrically in a square box 1, and is immovable relative to the box.

The connection wire of the recording apparatus is indicated by 8. In this case the box has an upper and a lower part which are identical. It is possible to cause the tapping coil 3 to take up four different positions in relation to the transmitting coil (not shown), without it being necessary to turn to the front the side of the box from which the connection wire 8 emerges (which would be impractical and unaesthetic). The possible positions of box 1 with the coil 3 are represented by *a*, *b*, *c* and *d*.

The position *b* is reached by rotating the box 1 by 90° in anticlorenive direction from position *a*. Position *c* is obtained by turning the box 1 over 180° from the position *a*, so that the lower side of the box 1 comes to the top. Finally position *d* is obtained by rotating the box 1 by 90° in clorenise direction from position *c*.

To ensure satisfactory working of the apparatus according to Fig. 1, it is of importance to fix the box 1 in the correct position relative to the telephone apparatus (not shown). This can be obtained by providing the upper surface or the upper and lower surface of the box 1 with a number of cams or grooves (not shown), corresponding with the lower side of the telephone apparatuses (not shown) in use, so that a telephone apparatus always occupies the same position on the box 1.

In the embodiment shown in Fig. 2, the square box 1 is provided with a detachable indicator plate (not shown) with inscription, which after determining the most favourable position (one of the positions *a*, *b*, *c* or *d*) is placed on the front of the box 1 with the upright inscription "Fore" or "Front." The correct position for the telephone apparatus concerned (not shown) is then indicated once and for all.

What I claim as new and desire to secure by Letters Patent, is:

An apparatus for picking up signals from a telephone voice coil eccentrically located in a telephone apparatus, comprising, in combination, a box having an axis of symmetry and two end faces extending transverse to said axis and adapted to fit to the base of the telephone apparatus; a pick-up coil arranged in said box and having an axis extending parallel to and eccentric with respect to said axis of symmetry of said box whereby said pick-up coil can be placed in a plurality of positions eccentric with respect to said axis of symmetry in the region of the eccentric telephone voice call by turning said box about said axis of symmetry thereof and by placing any of said end faces on top so as to couple said pick-up coil to the telephone voice coil; and means for attaching said pick-up coil to said box in said plurality of positions eccentric with respect to said axis of symmetry of said box.

References Cited in the file of this patent

UNITED STATES PATENTS

| | | |
|---|---|---|
| 2,048,604 | Finch | July 21, 1936 |
| 2,204,529 | Cooley | June 11, 1940 |
| 2,214,690 | Cooley | Sept. 10, 1940 |
| 2,381,097 | Adams | Aug. 7, 1945 |
| 2,384,604 | Dann | Sept. 11, 1945 |
| 2,441,840 | Petruschell | May 18, 1948 |
| 2,539,515 | De Forest | Jan. 30, 1951 |
| 2,578,924 | Curtis et al. | Dec. 18, 1951 |